(12) United States Patent
Iwane et al.

(10) Patent No.: US 8,935,131 B2
(45) Date of Patent: Jan. 13, 2015

(54) MODEL EXPRESSION GENERATION METHOD AND APPARATUS

(75) Inventors: Hidenao Iwane, Kawasaki (JP); Hirokazu Anai, Kawasaki (JP); Hitoshi Yanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 13/071,625

(22) Filed: Mar. 25, 2011

(65) Prior Publication Data

US 2011/0295573 A1    Dec. 1, 2011

(30) Foreign Application Priority Data

Jun. 1, 2010  (JP) ................................ 2010-125658

(51) Int. Cl.
  *G06F 7/60*     (2006.01)
  *G06F 17/10*    (2006.01)
  *G06F 17/50*    (2006.01)
  *G06F 17/11*    (2006.01)

(52) U.S. Cl.
  CPC .............. G06F 17/505 (2013.01); G06F 17/11 (2013.01); G06F 2217/08 (2013.01)
  USPC ............................................................ 703/2

(58) Field of Classification Search
  CPC ............................ G06F 17/11; G06F 2217/08
  USPC ............................................................ 703/2
  See application file for complete search history.

(56) References Cited

U.S. PATENT DOCUMENTS 5,424,964 A * 6/1995 Machala et al. .............. 716/112
7,979,832 B2 * 7/2011 Jung et al. .................... 716/134
8,364,450 B2 * 1/2013 Iwane et al. ...................... 703/2
8,498,844 B2 * 7/2013 Iwane et al. ...................... 703/2
8,533,653 B2 * 9/2013 Anai et al. .................... 716/136

FOREIGN PATENT DOCUMENTS

JP    2003-006263    10/2003

OTHER PUBLICATIONS

Nalam, Satyanand, et al. "A technology-agnostic simulation environment (TASE) for iterative custom ic design across processes." Computer Design, 2009. ICCD 2009. IEEE International Conference on. IEEE, 2009.*

(Continued)

*Primary Examiner* — Aniss Chad
(74) *Attorney, Agent, or Firm* — Staas & Halsey LLP

(57) ABSTRACT

When model expressions of objective functions are generated at vertexes of a quadrilateral on a plane concerning P and N channels of transistors in SRAM, the initial number of times of simulation is allocated to each objective function at each designated vertex according to weight values set based on relationships presumed among the objective functions at each designated vertex. For each objective function at each designated vertex, first simulation is executed the allocated number of times. Furthermore, a model expression is generated from the first simulation result, and an evaluation indicator of an approximation accuracy of the model expression is calculated. Then, for each model expression, it is determined whether the corresponding model expression has influence on the yield, and based on the evaluation indicator of the corresponding model expression and presence or absence of the influence, it is determined whether additional simulation is required for the corresponding objective function.

7 Claims, 11 Drawing Sheets

(56) References Cited

OTHER PUBLICATIONS

Mukhopadhyay, Saibal, Hamid Mahmoodi, and Kaushik Roy. "Modeling of failure probability and statistical design of SRAM array for yield enhancement in nanoscaled CMOS." Computer-Aided Design of Integrated Circuits and Systems, IEEE Transactions on 24.12 (2005): 1859-1880.*

Cadence Design Systems, Recommended Monte Carlo Modeling Methodology for Virtuoso Spectre Circuit Simulator Application Note, Nov. 2003.*

Anai, Hirokazu, "Introduction to Computational Real Algebraic Geometry" Series No. 1, Nov. 2007.

Anai, Hirokazu, "Introduction to Computational Real Algebraic Geometry" Series No. 2, Dec. 2007.

Anai, Hirokazu, "Introduction to Computational Real Algebraic Geometry" Series No. 3, Jan. 2008.

Anai, Hirokazu, "Introduction to Computational Real Algebraic Geometry" Series No. 4, Mar. 2008.

Anai, Hirokazu, "Introduction to Computational Real Algebraic Geometry" Series No. 5, Apr. 2008.

Yamaoka, Masanao, "Low Power SRAM Menu for SOC Application Using Yin-Yang-Feedback Memory Cell Technology," 2004, pp. 288-291.

Fujitsu, "Design Technology Based on Symbolic Computation," 2009, pp. 514-521.

Jirstrand, Mats, "Cylindrical Algebraic Decomposition — an Introduction," Oct. 18, 1995, pp. 1-38.

* cited by examiner

|   | VERTEX | COST FUNCTION | x1 | ... | xn | RESULT |
|---|---|---|---|---|---|---|
| 1 | A1 | SNM | m11 | ... | m1n | n1 |
| 2 | A1 | SNM | m21 | ... | m2n | n2 |
| 3 | A2 | SNM | m31 | ... | m3n | n3 |
| 4 | A3 | SNM | m41 | ... | m4n | n4 |
| 5 | A4 | SNM | m51 | ... | m5n | n5 |
| 6 | A1 | WM | m61 | ... | m6n | n6 |
| 7 | A2 | WM | m71 | ... | m7n | n7 |
| 8 | A3 | WM | m81 | ... | m8n | n8 |
| 9 | A3 | WM | m91 | ... | m9n | n9 |
| ⋮ | ⋮ | ⋮ | ⋮ | ⋮ | ⋮ | ⋮ |

| VERTEX | COST FUNCTION | MODEL EXPRESSION | EVALUATION INDICATOR OF APPROXIMATION ACCURACY | PRESENCE OR ABSENCE OF INFLUENCE |
|---|---|---|---|---|
| A1 | SNM | $SNM_{A1}(x_i)$ | | |
| A2 | SNM | $SNM_{A2}(x_i)$ | | |
| A3 | SNM | $SNM_{A3}(x_i)$ | | |
| A4 | SNM | $SNM_{A4}(x_i)$ | | |
| A1 | WM | $WM_{A1}(x_i)$ | | |
| A2 | WM | $WM_{A2}(x_i)$ | | |
| A3 | WM | $WM_{A3}(x_i)$ | | |
| A4 | WM | $WM_{A4}(x_i)$ | | |

| VERTEX | COST FUNCTION | MODEL EXPRESSION | EVALUATION INDICATOR OF APPROXIMATION ACCURACY | PRESENCE OR ABSENCE OF INFLUENCE |
|---|---|---|---|---|
| A1 | SNM | $SNM_{A1}(x_i)$ | 0.99 | |
| A2 | SNM | $SNM_{A2}(x_i)$ | 0.90 | |
| A3 | SNM | $SNM_{A3}(x_i)$ | 0.80 | |
| A4 | SNM | $SNM_{A4}(x_i)$ | 0.88 | |
| A1 | WM | $WM_{A1}(x_i)$ | 0.95 | |
| A2 | WM | $WM_{A2}(x_i)$ | 0.50 | |
| A3 | WM | $WM_{A3}(x_i)$ | 0.99 | |
| A4 | WM | $WM_{A4}(x_i)$ | 0.99 | |

FIG.9

| VERTEX | COST FUNCTION | MODEL EXPRESSION | EVALUATION INDICATOR OF APPROXIMATION ACCURACY | PRESENCE OR ABSENCE OF INFLUENCE |
|---|---|---|---|---|
| A1 | SNM | $SNM_{A1}(x_i)$ | 0.99 | PRESENCE |
| A2 | SNM | $SNM_{A2}(x_i)$ | 0.90 | ABSENCE |
| A3 | SNM | $SNM_{A3}(x_i)$ | 0.80 | ABSENCE |
| A4 | SNM | $SNM_{A4}(x_i)$ | 0.88 | ABSENCE |
| A1 | WM | $WM_{A1}(x_i)$ | 0.95 | ABSENCE |
| A2 | WM | $WM_{A2}(x_i)$ | 0.50 | ABSENCE |
| A3 | WM | $WM_{A3}(x_i)$ | 0.99 | PRESENCE |
| A4 | WM | $WM_{A4}(x_i)$ | 0.99 | PRESENCE |

FIG.12

MODEL EXPRESSION GENERATION METHOD AND APPARATUS

CROSS-REFERENCE TO RELATED APPLICATIONS

This application is based upon and claims the benefit of priority of the prior Japanese Patent Application No. 2010-125658, filed on Jun. 1, 2010, the entire contents of which are incorporated herein by reference.

FIELD

This technique relates a technique for designing a Static Random Access Memory (SRAM).

BACKGROUND

In a design stage of producing goods, design conditions are represented as a function (e.g. objective function, cost function or the like) of various parameters, and the parameters are optimized so that the value of the objective function becomes minimum, for example. In the design optimization of SRAM, while fluctuating values of several parameters to dozens of parameters, Simulation Program with Integrated Circuit Emphasis (SPICE) simulation is carried out for the corresponding shape to calculate a cost value with the cost function, and the shape minimizing the cost value is searched. However, when the number of parameters is large, there is a problem that it is impossible to obtain an optimum solution within a reasonable period of time, because the search space becomes broad and the number of times of the simulation increases.

Incidentally, a following technique for reducing the number of times of the simulation exists. Namely, in this technique, the influence of discrepancies of circuit element values due to the manufacturing process of the circuit or fluctuation of the use conditions to the circuit characteristics is analyzed. More specifically, after it is evaluated whether or not the distribution of the fluctuation factor parameters, which is determined by the Monte Carlo method, satisfies the analysis accuracy requested by the designer, the values of the fluctuation factor parameters are determined. Then, the minimum number of times of the circuit simulation, which satisfies the analysis accuracy requested by the designer is automatically determined. However, this technique does not use the characteristic peculiar to SRAM.

Namely, there is no conventional technique for reducing the number of times of the simulation to be carried out to generate a model expression for the SRAM design.

SUMMARY

According to one aspect of this technique, a model expression generation method is a method for generating model expressions of plural objective functions at vertexes of a quadrilateral relating to a yield on a plane for predetermined indicators concerning N and P channel of transistors in a Static Random Access Memory (SRAM). In addition, this method includes: (A) allocating the initial number of times of simulation to each of the plurality of objective functions at each of designated vertexes according to weight values that are set in advance based on relationships presumed among the plurality of objective functions at each of the designated vertexes; (B) carrying out, for each of the plurality of objective functions at each of the designated vertexes, first simulation the allocated number of times while changing values of predetermined parameters; (C) generating, for each of the plurality of objective functions at each of the designated vertexes, a first model expression from a result of the first simulation, and calculating a first evaluation indicator of an approximation accuracy of the first model expression; (D) first determining, for each of the generated first model expressions, whether the corresponding first model expression has influence on a predetermined yield model expression; and (E) second determining, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of data stored in a simulation data storage unit;

FIG. 8 is a diagram depicting an example of data stored in a model expression evaluation data storage unit;

FIG. 9 is a diagram depicting an example of data stored in the model expression evaluation data storage unit;

FIG. 12 is a diagram depicting an example of data stored in the model expression data storage unit.

DESCRIPTION OF EMBODIMENTS

Firstly, a plane relating to this embodiment of this technique will be explained using FIG. 1, for example. This plane is mapped by a predetermined indicator (e.g. a threshold voltage Vth of pMOS transistor, which is normalized by an average value or the like) for the P channel of the transistors included in SRAM and a predetermined indicator (e.g. a threshold voltage Vth of nMOS transistor, which is normalized by an average value or the like) for the N channel of the transistors included in SRAM. Incidentally, such a plane is discussed on a following paper and the like and is well-known.

M. Yamaoka, K. Osada, R. Tsuchiya, M. Horiuchi, S. Kimura, and T. Kawahara, "Low power SRAM menu for SOC application using Yin-Yang-feedback memory cell technology," Symp. VLSI Technology 2004 Dig. Tech. Papers, pp. 288-291, June 2004

In this embodiment, a set of parameters $x_i$ are searched, by which the yields $\psi(P,N,x_i)$ at all points within a designated region on such a PN plane become equal to or greater than a certain value c (or maximum). Incidentally, the parameter $x_i$ is a cell voltage, load gate length, driver gate length, transfer gate length, load width, driver width, transfer width, word line voltage, Vth of the load, Vth of the driver, Vth of the transfer or the like, for example.

Figure 1:
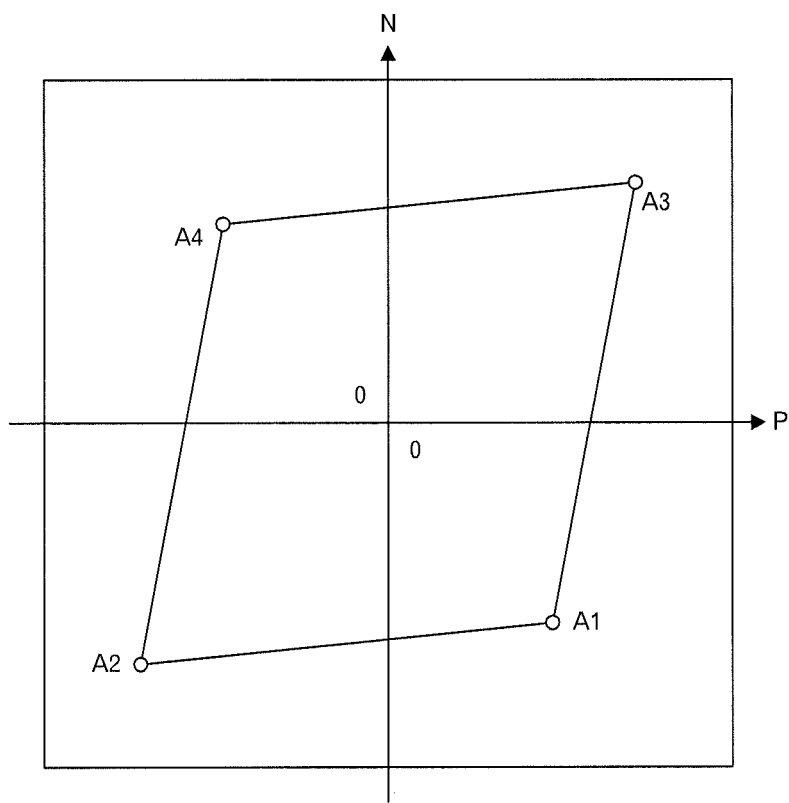
FIG. 1 is a diagram to explain a PN plane in this embodiment.

As depicted in FIG. 1, the designated region is designated as a quadrilateral (typically, parallelogram) formed by segments connecting the vertexes A1 to A4. For example, it is assumed that each vertex of this quadrilateral are designated so as to belong anyone of 4 quadrants on the PN plane. Generally, discrepancies occurs on the threshold voltage Vth according to the manufacturing process and the like, and like the vertex A1 in FIG. 1, a sample may occur that the threshold voltage of the pMOS transistor is greater than the average value, however, the threshold voltage of the nMOS transistor is less than the average value, for example. So, in this embodiment, permissible fluctuation ranges of Vth are designated by the quadrilateral.

Moreover, in this embodiment, the yield $\psi(P,N,x_i)$ is defined as follows:

$$\psi(P,N,x_i)=\min(SNM(P,N,x_i),WM(P,N,x_i))$$

SNM means a static noise margin, and WM means a write margin. SNM and WM are well-known cost functions. So, further explanation is omitted. These values are calculated by SPICE simulator, for example. $\psi(P,N,x_i)$ is defined as described above in order to search parameters $x_i$ by which SNM and WM, both of which are not bad, are calculated.

Because a huge amount of calculation is required when it is checked for all of the points within the aforementioned quadrilateral whether or not the yield $\psi(P,N,x_i) \geq c$ is satisfied, the four vertexes A1 to A4 are evaluated to identify a set of parameters $x_i$ satisfying $\psi(P,N,x_i) \geq c$ at these four points A1 to A4.

For example, it is assumed that coordinates A1=(2, −2), A2=(−3, −3), A3=(3, 3) and A4=(−2, 2) are designated.

In this case, satisfying $\psi(P,N,x_i)$ c at the four vertexes A1 to A4 is represented as follows:

$$\phi b(x_i) := \begin{bmatrix} \psi(3, 3, x_i) \geq c \wedge \\ \psi(-3, -3, x_i) \geq c \wedge \\ \psi(2, -2, x_i) \geq c \wedge \\ \psi(-2, 2, x_i) \geq c \end{bmatrix} = \begin{bmatrix} \min(SNM(3, 3, x_i), WM(3, 3, x_i)) \geq c \wedge \\ \min(SNM(-3, -3, x_i), WM(-3, -3, x_i)) \geq c \wedge \\ \min(SNM(2, -2, x_i), WM(2, -2, x_i)) \geq c \wedge \\ \min(SNM(-2, 2, x_i), WM(-2, 2, x_i)) \geq c \end{bmatrix} = \min \begin{pmatrix} SNM(3, 3, x_i), SNM(-3, -3, x_i), \\ SNM(2, -2, x_i), SNM(-2, 2, x_i), \\ WM(3, 3, x_i), WM(-3, -3, x_i), \\ WM(2, -2, x_i), WM(-2, 2, x_i) \end{pmatrix} \geq c \quad (1)$$

$\phi b(x_i)$ is defined in order to search a set of parameters $x_i$, by which the values of SNM and WM at all vertexes of the quadrilateral do not become bad, namely, both of the read operation and write operation can be appropriately carried out. In addition, in order to carry out modeling of SNM and WM per one vertex, 8 sets of simulations are required.

Figure 2:
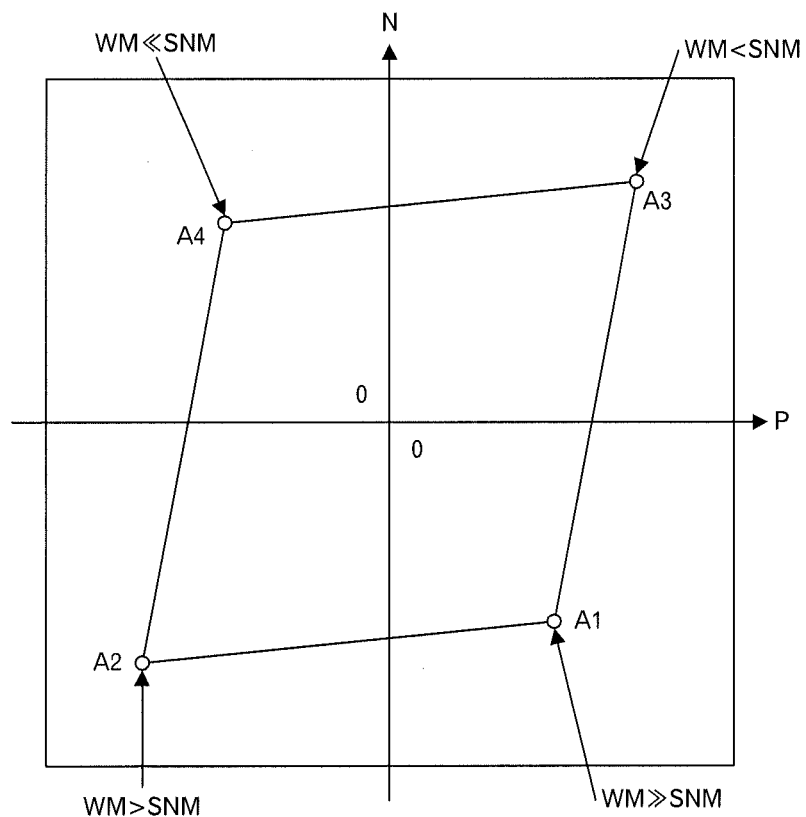
FIG. 2 is a diagram to explain the PN plane in this embodiment.

However, because, typically, the respective vertexes have following features as depicted in FIG. 2, it is possible to simplify $\phi b(x_i)$. Namely, typically, the relationship WM>>SNM (WM is very larger) is valid at the vertex A1, which is a lower right vertex of the quadrilateral. Therefore, it is sufficient that only SNM is considered. In addition, typically, the relationship WM>SNM is valid at the vertex A2, which is a lower left vertex of the quadrilateral. Therefore, it is sufficient that only SNM is considered. Furthermore, typically, the relationship WM<SNM is valid at the vertex A3, which is an upper right vertex of the quadrilateral. Therefore, it is sufficient that only WM is considered. In addition, typically, WM<<SNM (WM is very lesser) is valid at the vertex A4, which is an upper left vertex of the quadrilateral. Therefore, it is sufficient that only WM is considered. Therefore, when such relationships are valid, $\phi b(x_i)$ is represented as follows:

$$\phi b(x_i)=\min(WM(3,3,x_i),SNM(-3,-3,x_i),SNM(2,-2,x_i),WM(-2,2,x_i)) \geq c \quad (2)$$

Furthermore, typically, following tendencies are already known.

$$WM(-2,2)<WM(3,3)$$

(Namely, WM at the vertex A4, which is an upper left vertex of the quadrilateral<WM at the vertex A3, which is an upper right of the quadrilateral.)

$$SNM(2,-2)<SNM(-3,-3)$$

(Namely, SNM at the vertex A1, which is a lower right of the quadrilateral<SNM at the vertex A2, which is a lower left vertex of the quadrilateral.)

When such tendencies are known, the aforementioned $\phi b(x_i)$ can be further simplified.

However, such tendencies appear only in the typical case, and do not always appear. As a result, it is only confirmed that such tendencies are applicable. Therefore, it is necessary to search a set of parameters $x_i$ satisfying the expression (1). In the conventional art, an objective function was defined as expressed like the expression (1) by using the genetic algorithm or the like to optimize values of the respective parameters $x_i$.

Generally, in the shape design of SRAM, the modeling error is not permitted, and the modeling having high accuracy is required. However, the accuracy is required only for portion affecting $\phi b(x_i)$.

Figure 3:
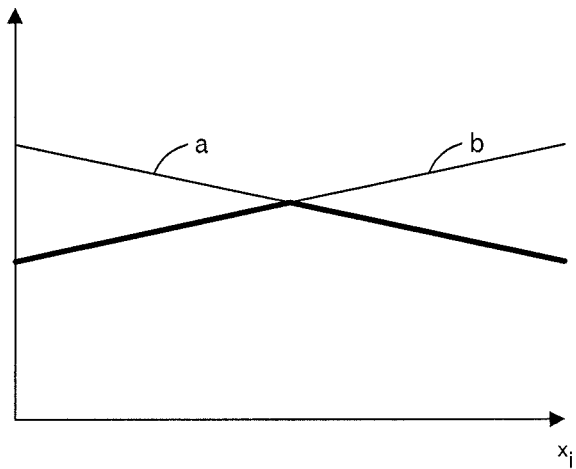
FIG. 3 is a diagram to explain influence on yield.
Figure 4:
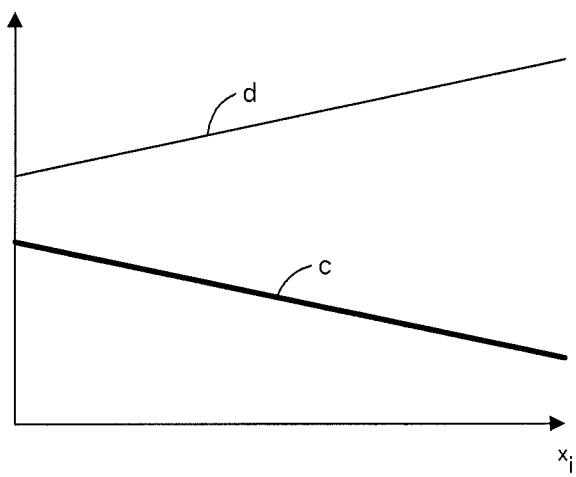
FIG. 4 is a diagram to explain the influence on the yield.

The presence or absence of the influence on $\phi b(x_i)$ is depicted in FIGS. 3 and 4, for example. In FIGS. 3 and 4, the horizontal axis represents a parameter $x_i$, and the vertical axis represents a value of SNM or WM. Because $\phi b(x_i)$ is a function which adopts a lesser output value, a portion of the straight line a is less than a straight line b, and a portion of the straight line b is less than the straight line a, when SNM and WM are represented by the straight lines a and b for the parameter $x_i$ as depicted in FIG. 3. In such a case, it is determined that the straight lines a and b have influence on $\phi b(x_i)$. On the other hand, as depicted in FIG. 4, when the straight line c is always less than a straight line d, the straight line d does not have influence on $\phi b(x_i)$. There is little problem even when the accuracy of the modeling for the cost function, which does not have influence on $\phi b(x_i)$, (i.e. WM and SNM at the respect vertexes, which appear in $\phi b(x_i)$) is lowered.

In this embodiment, by confirming the approximation accuracy and the presence or absence of the influence on $\phi b(x_i)$ after carrying out weighted allocation of the initial number of times of the simulation to the cost functions based on the tendencies as depicted in FIG. 2, the validity for the weighted allocation of the number of times of the simulation is determined, and if a cost function for which the weighted allocation is not valid is found, the model expression is generated again by carrying out additional simulation for such a cost function.

Next, a specific embodiment will be explained by using FIGS. 5 to 12.

Figure 5:
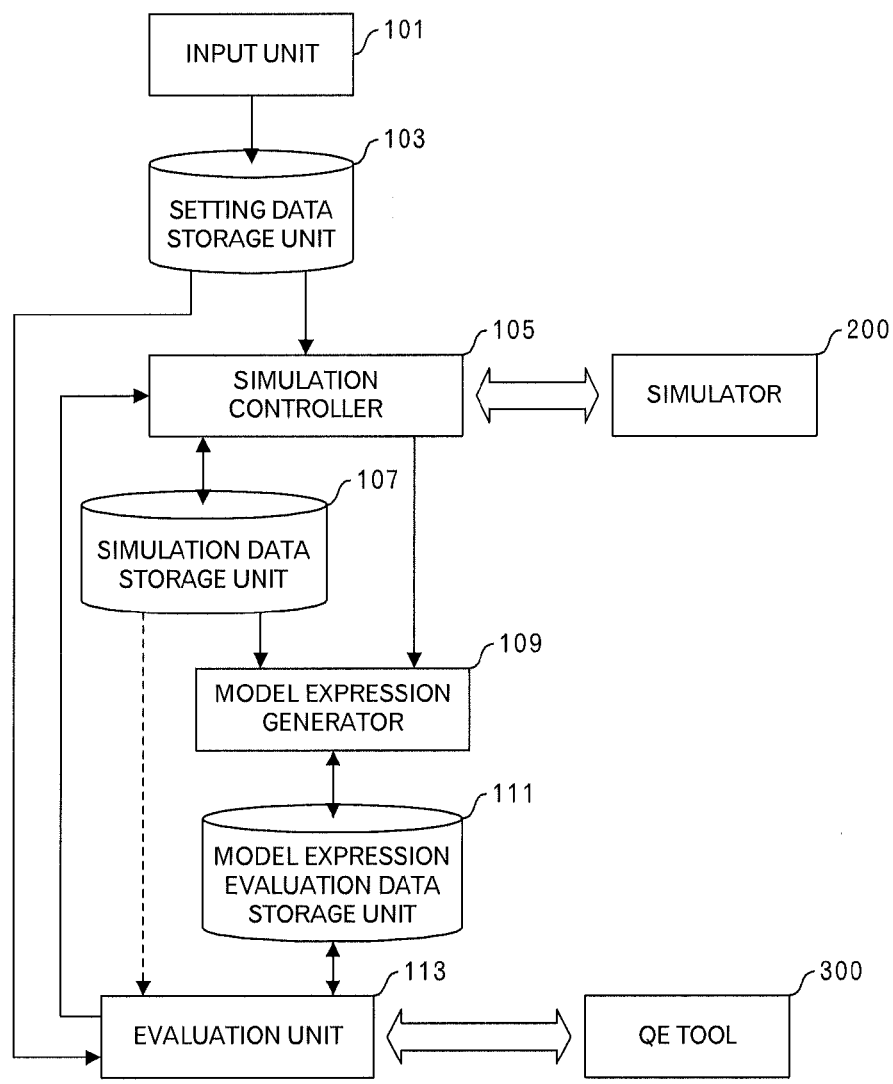
FIG. 5 is a functional block diagram of a model expression generation apparatus.

FIG. 5 illustrates a functional block diagram of a model expression generation apparatus this embodiment. The model expression generation apparatus has (A) an input unit 101 to accept inputs from the user; (B) a setting data storage unit 103 storing setting data accepted by the input unit 101; (C) a simulation controller 105 that carries out a processing such as control for the simulator 200 by using data stored in the setting data storage unit 103; (D) a simulation data storage unit 107 storing data used by the simulation controller 105 and processing results; (E) a model expression generator 109 that carries out a processing such as generation of the model expression by using data stored in the simulation data storage unit 107; (F) a model expression evaluation data storage unit 111 storing data such as model expressions generated by the model expression generator 109; and (G) an evaluation unit 113 that cooperates with a Quantifier Elimination (QE) tool to carry out an evaluation processing by using data stored in the model expression evaluation data storage unit 111 and setting data storage unit 103. The evaluation unit 113 outputs an instruction to the simulation controller 105, when regeneration of the model expressions is required. The simulation controller 105 instructs the model expression generator 109 to carry out the generation of the model expressions again when the additional simulation is carried out. The simulator 200 and QE tool 300 may be included in the model expression generation apparatus, and the simulator 200 and QE tool 300, which are implemented in another apparatus, may be utilized.

The QE tool 300 is a tool that transforms an expression such as $\exists x(x^2+bx+c=0)$ to an equivalent expression $b^2-4c \geq 0$, by removing a quantifier (i.e. $\exists$ and $\forall$), and carries out a quantifier removal processing and the like to judge whether or not the feasible region that follows a processing conditions and/or the like in a determination problem that quantifiers are attached to all of the variables.

Specifically, refer to following documents. However, because there are a lot of documents about QE, other useful documents other than the following documents also exist.

Anai Hirokazu and Yokoyama Kazuhiro, "Introduction to Computational Real Algebraic Geometry", *Mathematics Seminar*, Nippon-Hyoron-sha Co., Ltd., "Series No. 1", Vol. 554, pp. 64-70, November, 2007, "Series No. 2", Vol. 555, pp. 75-81, December, 2007, "Series No. 3", Vol. 556, pp. 76-83, January, 2008, "Series No. 4", Vol. 558, pp. 79-85, March, 2008, "Series No. 5", Vol. 559, pp. 82-89, April, 2008.

Anai Hirokazu, Kaneko Junj, Yanami Hitoshi and Iwane Hidenao, "Design Technology Based on Symbolic Computation", *FUJITSU*, Vol. 60, No. 5, pp. 514-521, September, 2009.

Jirstrand Mats, "Cylindrical Algebraic Decomposition— an Introduction", Oct. 18, 1995.

In addition, QE is a technique, which has been implemented in SyNRAC developed by Fujitsu Laboratories Ltd., or the like.

In addition, the simulator 200 is a SPICE simulator, for example. The SPICE simulator is well-known. Therefore, further explanation is omitted.

Figure 6:
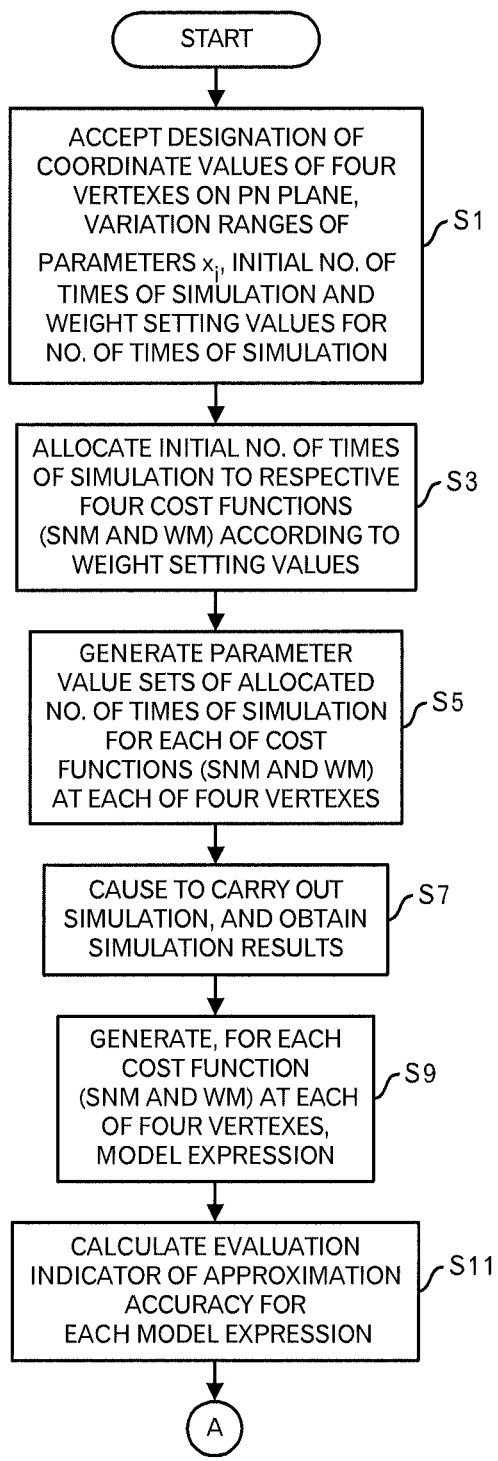
FIG. 6 is a diagram depicting a processing flow relating to the embodiment.

Next, an operation of the model expression generation apparatus depicted in FIG. 5 will be explained by using FIGS. 6 to 12. First, a user who generates the model expressions inputs coordinate values of the four vertexes of the quadrilateral on the PN plane, variation widths $V_i$ of parameters $x_i$, the initial number of times of the simulation and weight setting values $w_j$ for the initial number of times of the simulation to the input unit 101 of the model expression generation apparatus. The input unit 101 accepts inputs of such data, and stores the accepted data into the setting data storage unit 103 (FIG. 6: step S1). Then, the simulation controller 105 allocates the initial number of times of the simulation to the respective cost functions (SNM and WM) at the four vertexes according to the weight setting values $w_j$ by using the initial number of times of the simulation and weight setting values for the initial number of times of the simulation, which are stored in the setting data storage unit 103, and stores data of the allocation results into the simulation data storage unit 107 (step S3).

For example, it is assumed that the weight setting values w1=0.5, w2=0.25, w3=0.15 and w4=0.1 are inputted. Incidentally, w1+w2+w3+w4=1 are satisfied. Moreover, it is assumed that the coordinate values of the four vertexes are inputted as described above. Furthermore, when the relationships among the cost functions, which were illustrated in FIG. 2, are predicted, a similar tendency can be found for the vertexes A1 and A2, although the strength of the tendency is different, and a similar tendency can be found for the vertexes A3 and A4, although the strength of the tendency is different. Therefore, the initial number of times of the simulation is divided into two to separately allocate them.

In addition, not only the relationships SNM at the vertex A1<<WM at the vertex A1 and SNM at the vertex A2<WM at the vertex A2 but also SNM at the vertex A1<SNM at the vertex A2 are presumed. Therefore, it is also presumed that SNM at the vertex A1, SNM at the vertex A2, WM at the vertex A2 and WM at the vertex A1 are arranged in ascending order. Therefore, the initial number of times of the simulation is allocated as follows:

SNM at the vertex A1: w1*N/2
SNM at the vertex A2: w2*N/2
WM at the vertex A2: w3*N/2
WM at the vertex A1: w4*N/2

Similarly, not only the relationships WM at the vertex A3<SNM at the vertex A3 and WM at the vertex A4<<SNM at the vertex A4 not also the relationship WM at the vertex A4<WM at the vertex A3 are presumed. Therefore, it is also presumed that WM at the vertex A4, WM at the vertex A3, SNM at the vertex A3 and SNM at the vertex A4 are arranged in ascending order. Therefore, the initial number N of times of the simulation is allocated as follows:

WM at the vertex A4: w1*N/2
WM at the vertex A3: w2*N/2
SNM at the vertex A3: w3*N/2
SNM at the vertex A4: w4*N/2

Such calculated allocation data for each cost function at each vertex is stored in the simulation data storage unit 107.

Next, the simulation controller 105 generates, for each cost function (SNM and WM) at each of the four vertexes, parameter value sets of the allocated number of times, and stores the generated data into the simulation data storage unit 107 (step S5). A value of each parameter $x_i$ is generated within the variation range $V_i$ stored in the setting data storage unit 103 according to a well-known method such as Latin Hypercubic method, and is stored into the simulation data storage unit 107. For example, data as depicted in FIG. 7 is stored. In the example of FIG. 7, for each combination of the vertex and cost function, $x_i$ (here, $1 \leq i \leq n$) and simulation result are stored. The number of parameter value sets, which are generated for each combination of the vertex and cost function, follows the allocation of the initial number of times of the simulation as described above. Incidentally, the simulation result is not registered at the step S5.

Then, the simulation controller 105 causes the simulator 200 to carry out the simulation by designating, for each record as depicted in FIG. 7, the vertex (p,n), parameter value set and cost function type, obtains the simulation result (i.e. value of the cost function SNM or value of the cost function WM), and stores the simulation result into the simulation data storage unit 107 (step S7).

After this, the model expression generator 109 generates a model expression for each cost function at each of the four vertexes, by using the parameter value sets and simulation results, which are stored in the simulation data storage unit 107, and stores data of the generated model expressions into the model expression evaluation data storage unit 111 (step S9). The generation of the model expression is carried out by a well-known method such as the least squares method. Therefore, further explanation is omitted. Incidentally, data as schematically depicted in FIG. 8 is stored into the model expression evaluation data storage unit 111. In the example of FIG. 8, for each combination of the vertex and cost function, the model expression, approximation accuracy evaluation indicator and presence or absence of the influence on the yield $\phi b(x_i)$ are registered. Incidentally, at the step S9, only model expressions are registered. In addition, in the example of FIG. 8, simplified forms of the model expressions such as $SNM_{A1}(x_i)$ and $WM_{A1}(x_i)$ are depicted. However, coefficient values of terms of the predetermined variables $x_i$ may be registered.

Furthermore, the model expression generator 109 (or evaluation unit 113) calculates the approximation accuracy evaluation indicator of each model expression, and stores the calculated indicators into the model expression evaluation data storage unit 111 (step S11). The approximation accuracy evaluation indicator is a correlation coefficient, for example. As for the approximation accuracy evaluation indicator, which is not the correlation coefficient, the sum of squares of the difference between a function value calculated by substituting the parameter value set generated at the step S5 and used for the model expression generation into the model expression and the simulation result may be adopted. When executing the step S11, data as depicted in FIG. 9 is stored into the model expression evaluation data storage unit 111. Namely, for each generated model expression, the approximation evaluation indicator is stored. The processing moves to a processing depicted in FIG. 10 through a terminal A.

Figure 10:
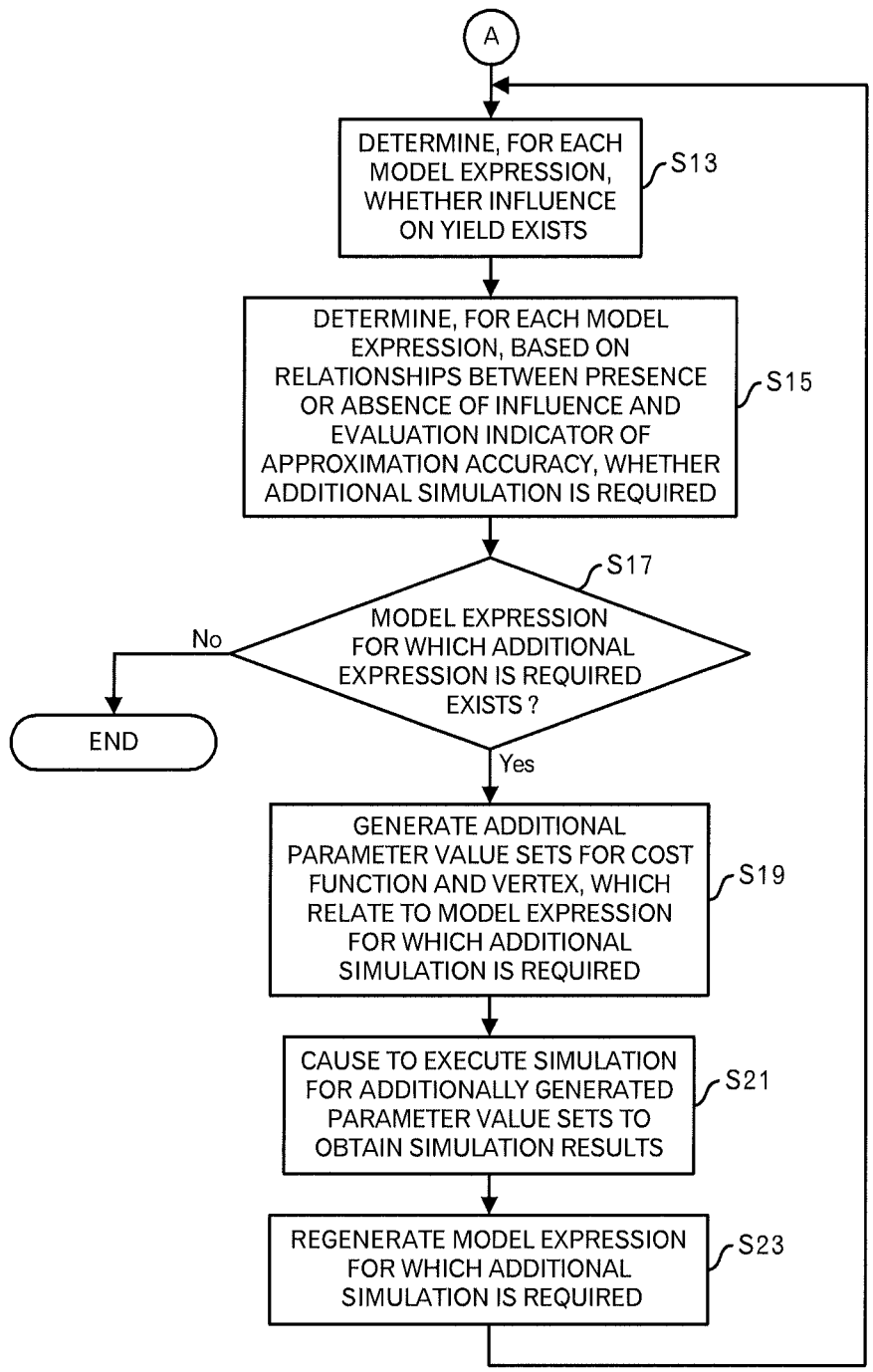
FIG. 10 is a diagram depicting the processing flow relating to the embodiment.
Figure 11:
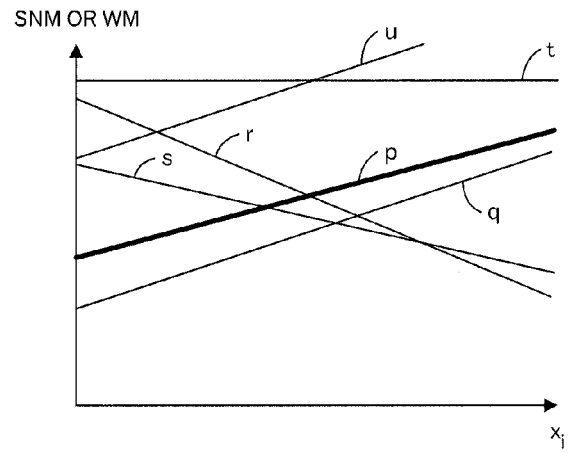
FIG. 11 is a diagram to explain determination of whether or not the model expression has influence on the yield.

Shifting to explanation of the processing of FIG. 10, the evaluation unit 113 determines the presence or absence of the influence on the yield $\phi b(x_i)$ for each model expression by using data stored in the model expression evaluation data storage unit 111 (step S13). Specifically, it is determined whether or not values of the model expression are not greater values of the other model expressions. For example, as depicted in FIG. 11, the horizontal axis represents the parameter $x_i$, and the vertical axis represents SNM or WM. In addition, it is assumed that the straight lines p to u, which represent the model expressions, are obtained. Thus, for example, when $SNM_{A1}(x_i)$ corresponds to the straight line p, the straight line p is always higher than the straight line q, and a portion of the straight line p is higher than the straight lines r and s. Therefore, it can be determined that the straight line p does not have no influence on the yield $\phi b(x_i)$, which is the minimum value of the respective model expressions. Incidentally, the straight line is a mere example, and the curved line may be applied.

As for this determination, the evaluation unit 113 generates a QE problem as described below, outputs the QE problem to the QE tool 300, and determines whether the solution is "true" or "false". Incidentally, this is a QE problem for the determination of $SNW_{A1}(x_i)$.

Incidentally, when the range of each variable is represented as $V_i$, $D(x_i)$ is defined as $x_1 \in V_1$ AND $x_2 \in V_2$ AND ... $x_n \in V_n$. However, $D(x_1, x_2) = (x_1^2 + x_2^2 \leq 1)$ may be used, which represents a range within a unit circle.

(a) $SNM_{A1}(x_i)$ $$\forall x_i(D(x_i) \Rightarrow SNM_{A1}(x_i) \geq SNM_{A2}(x_i) \vee SNM_{A1}(x_i)$$
$$\geq SNM_{A3}(x_i) \vee SNM_{A1}(x_i) \geq SNM_{A4}(x_i) \vee SNM_{A1}$$
$$(x_i) \geq WM_{A1}(x_i) \vee SNM_{A1}(x_i) \geq WM_{A2}(x_i) \vee SNM_{A1}$$
$$(x_i) \geq WM_{A3}(x_i) \vee SNM_{A1}(x_i) \geq WM_{A4}(x_i)) \quad (3)$$

When the solution of the QE problem is "true", it is determined that there is no influence. On the other hand, when it is "false", it is determined that there is influence.

Similarly, the QE problem as described below is generated and outputted to the QE tool 300 to instruct the execution of the processing.

(b) $SNM_{A2}(x_i)$ $$\forall x_i(D(x_i) \Rightarrow SNM_{A2}(x_i) \geq SNM_{A1}(x_i) \vee SNM_{A2}(x_i)$$
$$\geq SNM_{A3}(x_i) \vee SNM_{A2}(x_i) \geq SNM_{A4}(x_i) \vee SNM_{A2}$$
$$(x_i) \geq WM_{A1}(x_i) \vee SNM_{A2}(x_i) \geq WM_{A2}(x_i) \vee SNM_{A2}$$
$$(x_i) \geq WM_{A3}(x_i) \vee SNM_{A2}(x_i) \geq WM_{A4}(x_i))$$

(c) $SNM_{A3}(x_i)$ $$\forall x_i(D(x_i) \Rightarrow SNM_{A3}(x_i) \geq SNM_{A1}(x_i) \vee SNM_{A3}(x_i)$$
$$\geq SNM_{A2}(x_i) \vee SNM_{A3}(x_i) \geq SNM_{A4}(x_i) \vee SNM_{A3}$$
$$(x_i) \geq WM_{A1}(x_i) \vee SNM_{A3}(x_i) \geq WM_{A2}(x_i) \vee SNM_{A3}$$
$$(x_i) \geq WM_{A3}(x_i) \vee SNM_{A3}(x_i) \geq WM_{A4}(x_i))$$

(d) $SNM_{A4}(x_i)$ $$\forall x_i(D(x_i) \Rightarrow SNM_{A4}(x_i) \geq SNM_{A1}(x_i) \vee SNM_{A4}(x_i)$$
$$\geq SNM_{A2}(x_i) \vee SNM_{A4}(x_i) \geq SNM_{A3}(x_i) \vee SNM_{A4}$$
$$(x_i) \geq WM_{A1}(x_i) \vee SNM_{A4}(x_i) \geq WM_{A2}(x_i) \vee SNM_{A4}$$
$$(x_i) \geq WM_{A3}(x_i) \vee SNM_{A4}(x_i) \geq WM_{A4}(x_i))$$

(e) $WM_{A1}(x_i)$ $$\forall x_i(D(x_i) \Rightarrow WM_{A1}(x_i) \geq SNM_{A1}(x_i) \vee WM_{A1}(x_i)$$
$$\geq SNM_{A2}(x_i) \vee WM_{A1}(x_i) \geq SNM_{A3}(x_i) \vee WM_{A1}(x_i)$$
$$\geq SNM_{A4}(x_i) \vee WM_{A1}(x_i) \geq WM_{A2}(x_i) \vee WM_{A1}(x_i)$$
$$\geq WM_{A3}(x_i) \vee WM_{A1}(x_i) \geq WM_{A4}(x_i))$$

(f) $WM_{A2}(x_i)$ $$\forall x_i(D(x_i) \Rightarrow WM_{A2}(x_i) \geq SNM_{A1}(x_i) \vee WM_{A2}(x_i)$$
$$\geq SNM_{A2}(x_i) \vee WM_{A2}(x_i) \geq SNM_{A3}(x_i) \vee WM_{A2}(x_i)$$
$$\geq SNM_{A4}(x_i) \vee WM_{A2}(x_i) \geq WM_{A1}(x_i) \vee WM_{A2}(x_i)$$
$$\geq WM_{A3}(x_i) \vee WM_{A2}(x_i) \geq WM_{A4}(x_i))$$

(g) $WM_{A3}(x_i)$ $$\forall x_i(D(x_i) \Rightarrow WM_{A3}(x_i) \geq SNM_{A1}(x_i) \vee WM_{A3}(x_i)$$
$$\geq SNM_{A2}(x_i) \vee WM_{A3}(x_i) \geq SNM_{A3}(x_i) \vee WM_{A3}(x_i)$$
$$\geq SNM_{A4}(x_i) \vee WM_{A3}(x_i) \geq WM_{A1}(x_i) \vee WM_{A3}(x_i)$$
$$\geq WM_{A2}(x_i) \vee WM_{A3}(x_i) \geq WM_{A4}(x_i))$$

(h) $WM_{A4}(x_i)$ $$\forall x_i(D(x_i) \Rightarrow WM_{A4}(x_i) \geq SNM_{A1}(x_i) \vee WM_{A4}(x_i)$$
$$\geq SNM_{A2}(x_i) \vee WM_{A4}(x_i) \geq SNM_{A3}(x_i) \vee WM_{A4}(x_i)$$
$$\geq SNM_{A4}(x_i) \vee WM_{A4}(x_i) \geq WM_{A1}(x_i) \vee WM_{A4}(x_i)$$
$$\geq WM_{A2}(x_i) \vee WM_{A4}(x_i) \geq WM_{A3}(x_i))$$

The result of such a processing is stored in the model expression evaluation data storage unit 111. When carrying out the processing up to the step S13, data as depicted in FIG. 12 is stored, for example. In the example of FIG. 12, it is determined that $SNM_{A1}$, $WM_{A3}$ and $WM_{A4}$ have the influence.

Then, the evaluation unit 113 determines the necessity of the additional simulation from the relationship between the presence or absence of the influence and the approximation evaluation indicator for each model expression, and stores the determination results into the model expression evaluation data storage unit 111 (step S15). For example, a first threshold (e.g. "0.80") for the approximation accuracy evaluation indicator is set for "absence of influence" in advance, and a second threshold (e.g. "0.95") for the approximation accuracy evaluation indicator is set for "presence of influence" in advance. Then, based on this data, the necessity of the additional simulation is determined.

In the example of FIG. 12, because $SNM_{A1}(x_i)$ is determined as "presence of influence", the second threshold "0.95" is applied. However, because the approximation accuracy evaluation indicator is "0.99", it is determined that there is no need to carry out the additional simulation. As for $SNM_{A2}(x_i)$, because "absence of influence" is determined, the first threshold "0.80" is applied. However, because the approximation accuracy evaluation indicator is "0.90", it is determined that there is no need to carry out the additional simulation. As for $SNM_{A3}(x_i)$, because "absence of influence" is determined, the first threshold "0.80" is applied. However, because the approximation accuracy evaluation indicator is "0.80", it is determined that there is no need to carry out the additional simulation. As for $SNM_{A4}(x_i)$, because "absence of influence" is determined, the first threshold "0.80" is applied. However, because the approximation accuracy evaluation indicator is "0.88", it is determined that there is no need to carry out the additional simulation.

As for $WM_{A1}(x_i)$, because "absence of influence" is determined, the first threshold "0.80" is applied. However, because the approximation accuracy evaluation indicator is "0.95", it is determined that there is no need to carry out the additional simulation. As for $WM_{A2}(x_i)$, because "absence of influence" is determined, the first threshold "0.80" is applied. However, because the approximation accuracy evaluation indicator is "0.50" and less than the first threshold, it is determined that there is need to carry out the additional simulation. As for $WM_{A3}(x_i)$, because "presence of influence" is determined, the first threshold "0.95" is applied. However, because the approximation accuracy evaluation indicator is "0.99", it is determined that there is no need to carry out the additional simulation. As for $WM_{A4}(x_i)$, because "presence of influence" is determined, the first threshold "0.95" is applied. However, because the approximation accuracy evaluation indicator is "0.99", it is determined that there is no need to carry out the additional simulation.

Thus, in the example of FIG. 12, the additional simulation is required for $WM_{A2}(x_i)$.

The evaluation unit 113 judges whether or not any model expression for which the additional simulation is required (step S17), and when there is no model expression for which the additional expression is required, the model expressions having the sufficient approximation accuracy corresponding to the presence or absence of the influence on the yield $\phi b(x_i)$ have been generated. Therefore, the processing ends.

On the other hand, when there is a model expression for which the additional simulation is required, the evaluation unit 113 notifies the simulation controller 105 of the vertex relating to the model expression for which the additional simulation is required and cost function type.

In response to notification from the evaluation unit 113, the simulation controller 105 generates a predetermined number of additional parameter value sets for the vertex and cost function, which relate to the model expression for which the additional simulation is required, and stores the generated data into the simulation data storage unit 107 (step S19). The predetermined number at this step may be the same for any combination of the vertex and cost function. For example, a predetermined ratio (e.g. 10%) of the initial number of times of the simulation may be added. Furthermore, because there is a method for determining the number of times of the simulation by using the characteristic peculiar to SRAM, such a method may be used. In addition, a predetermined ratio of the initial allocation may be added.

Incidentally, in order to carry out this step efficiently, a technique disclosed in a Japanese Patent Application No. 2008-294943 and counterpart U.S. application, which is incorporated herein by reference, can be used. This application discloses a following technique. Namely, plural sets of design parameter values for SRAM shape or the like are inputted, and by carrying out multi objective optimization processing while calculating each value of objective functions such as SNW and WM, for example, determination of a set of optimum design parameter values is supported. Specifically, an initial input design parameter samples determination unit determines a first predetermined set of design parameter samples as the initial input design parameter sample sets for each of the plural objective functions. A first objective function modeling unit calculates, for each of the plural objective functions, a first modeling objective function by modeling each of the plural objective functions, by formula approximation, while calculating each value of the plural objective functions for the input design parameter sample sets. A weight determination unit determines, for each value of the plural objective functions, the weight according to whether or not the value is included in the value range designated as the region for which the accuracy is required, and whether or not the value is less than a reference value of any other objective function or first modeling objective function, which corresponds to the input design parameter sample set from which the value is calculated.

A second objective function modeling unit carries out modeling of the respective plural objective functions by the expression approximation to calculate the second modeled objective function, while carrying out modeling according to the weight determined for each value of the plural objective functions based on the input design parameter sample set and the respective values of the plural objective functions calculated in association with the input design parameter sample set. An accuracy condition determination unit determines, for each of the plural second modeled objective functions, whether or not accuracy information calculated by the second objective function modeling unit satisfies designated accuracy conditions. When the accuracy condition determination unit determines that the accuracy conditions are satisfied, an output modeling objective function determination unit determines the second modeled objective function relating to that determination, as an output modeled objective function for calculating a set of optimum design parameters. When the accuracy condition determination unit determines that the accuracy conditions are not satisfied, a modeled objective function value calculation unit calculates the respective values of the second modeled objective functions relating to that second determination for a second predetermined sets of design parameter samples, which are more than the first predetermined sets. When the respective values of the calculated second modeled objective functions are included in the value range designated as the regions with high accuracy and is less than any values of any other second modeled objective functions, which are calculated from the design parameter sample set corresponding to the value, a reverse image calculation unit stores the design parameter sample set from which the value is calculated in association with the objective function corresponding to the value. A modeling iteration controller determines, for each objective function corresponding to the second modeled objective function relating to the second determination, new input design parameter sample sets based on the current input design parameter sample sets and the design parameter sample set stored by the reverse image calculation unit in association with the objective function, inputs the determined data into the first objective function modeling unit, and causes the first objective function modeling unit, weight determination unit, second objective function modeling unit and accuracy condition determination unit to repeat their operations. In the aforementioned mode, the first and second objective function modeling units approximate the objective function by the polynomial expressions obtained by the linear regression analysis based on the input design parameter sample sets and respective values of the plural objective functions calculated in association with the input design parameter sample set.

Then, the simulation controller 105 causes the simulator 200 to carry out the simulation for each of the additionally generated parameter value sets, obtains the simulation results and stores the obtained simulation results into the simulation data storage unit 107 (step S21). The data generated at the steps S19 and S21 is stored into the simulation data storage unit 107 in a format as depicted in FIG. 7, for example.

After that, the simulation controller 105 notifies the model expression generator 109 of the vertex and cost function type, for which the additional simulation is required, and requests the model expression generator 109 to generate the corresponding model expression again. The model expression generator 109 regenerates the model expression relating to the vertex and cost function for which the additional simulation is required, according to the notification from the simulation controller 105, and stores data of the generated model expression into the model expression evaluation data storage unit 111 (step S23). For example, by using the simulation results additionally generated and the simulation results previously generated, model expression is regenerated by the least square method or the like. Then, the processing returns to the step S13.

By carrying out such a processing, the approximation accuracy evaluation indicator can be improved. Incidentally, when the model expression is changed, there is possibility that the determination of the presence or absence of the influence on the yield $\phi b(x_i)$ is changed. Therefore, the processing returns to the step S13 to determine the presence or absence of the influence on the yield $\phi b(x_i)$ for all of the model expressions.

By carrying out the aforementioned processing, it is possible to allocate the initial number of times of the simulation using the weight according to the characteristics on the PN plane. Therefore, while keeping the similar accuracy, the total number of times of the simulation can be reduced, compared with a case that the initial number of times of the simulation is equally allocated to the respective cost functions. Incidentally, if necessary, the additional simulation is carried out. Therefore, it becomes efficient. Thus, the processing time is shortened.

Although the embodiment of this technique was explained above, this technique is not limited to this embodiment. For example, the functional block diagram depicted in FIG. 5 is a mere example, and does not always correspond to an actual program module configuration.

Figure 13:
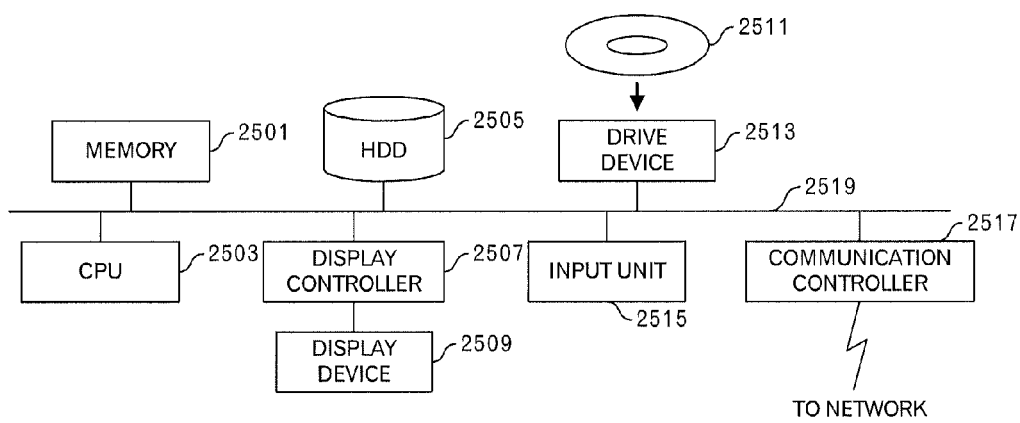
FIG. 13 is a functional block diagram of a computer.

In addition, the model expression generation apparatus is a computer device as shown in FIG. 13. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 13. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

A model expression generation method relating to this embodiment is a method for generating model expressions of plural objective functions (e.g. SNM and WM) at vertexes (in some cases, vertexes of a solid for which the yield is to be considered in a space) of a quadrilateral relating to a yield on a plane for predetermined indicators concerning N and P channel of transistors in a Static Random Access Memory (SRAM). Moreover, this method includes: (A) allocating the initial number of times of simulation to each of the plurality of objective functions at each of designated vertexes according to weight values that are set in advance based on relationships presumed among the plurality of objective functions at each of the designated vertexes; (B) carrying out, for each of the plurality of objective functions at each of the designated vertexes, first simulation the allocated number of times while changing values of predetermined parameters; (C) generating, for each of the plurality of objective functions at each of the designated vertexes, a first model expression from a result of the first simulation, and calculating a first evaluation indicator of an approximation accuracy of the first model expression; (D) first determining, for each of the generated first model expressions, whether the corresponding first model expression has influence on a predetermined yield model expression; and (E) second determining, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function.

When the model expressions can be generated with appropriate accuracy corresponding to whether or not the model expression has influence on the yield model expression as a result of allocating the initial number of times of the simulation based on the weight values, it is possible to reduce the entire number of times of the simulation, compared with a case where the number of times of the simulation is equally allocated to each of the plural objective functions at each of the designated vertexes. Incidentally, even when the lack of the approximation accuracy is found, the entire number of times of the simulation can be reduced in case where the additional number of times of the simulation is appropriately determined.

Incidentally, the aforementioned first evaluation indicator may be a correlation coefficient. The evaluation indicator may be a indicator representing other error.

Furthermore, the first determining may comprise: determining by a quantifier elimination method, whether a relationship that a specific model expression among the generated first model expressions is equal to or greater than any one of the generated first model expressions other than the specific model expression for all of the predetermined parameters. Thus, it becomes possible to easily determine whether or not the high accuracy is required.

Furthermore, the second determining may comprise: upon determining that the corresponding first model expression has influence on the yield model expression, determining whether the first evaluation indicator of the corresponding first model expression is equal to or greater than a first threshold; and upon determining that the corresponding first model expression does not have influence on the yield model expression, determining whether the first evaluation indicator of the corresponding first model expression is equal to or greater than a second threshold less than the first threshold. When the first model expression has influence, higher approximation accuracy is requested, and when the first model expression has no influence, relatively lower approximation accuracy may be acceptable. However, when the approximation accuracy is too lower, the determination of whether or not the first model expression has no influence on the yield model expression is doubtful. Therefore, the second threshold is adopted.

Furthermore, this model expression generation method may further include: (F) carrying out the additional simulation the predetermined number of times, for a combination of the objective function and the designated vertex, for which it is determined in the second determining that the additional simulation is required, while changing values of the predetermined parameters; (G) generating a second model expression for the combination by using the result of the first simulation and a result of the additional simulation; and (H) calculating a second evaluation indicator of the approximation accuracy for the second model expression. In such a case, the first model expression and the first evaluation value for the combination may be replaced with the second model expression and the second evaluation value for the combination to execute the first determining and the second determining. Thus, it becomes possible to generate a model expression whose accuracy is improved.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process for generating model expressions of a plurality of objective functions at vertexes of a quadrilateral on a plane for predetermined indicators concerning P and N channels of transistors in a Static Random Access Memory, the process comprising:

allocating the initial number of times of simulation to each of the plurality of objective functions at each of designated vertexes according to weight values that are set in advance based on relationships presumed among the plurality of objective functions at each of the designated vertexes;

carrying out, for each of the plurality of objective functions at each of the designated vertexes, first simulation the allocated number of times while changing values of predetermined parameters;

generating, for each of the plurality of objective functions at each of the designated vertexes, a first model expression from a result of the first simulation, and calculating a first evaluation indicator of an approximation accuracy of the first model expression;

first determining, for each of the generated first model expressions, whether the corresponding first model expression has influence on a predetermined yield model expression; and second determining, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function, and wherein the second determining comprises:

upon determining that the corresponding first model expression has influence on the yield model expression, determining whether the first evaluation indicator of the corresponding first model expression is equal to or greater than a first threshold; and upon determining that the corresponding first model expression does not have influence on the yield model expression, determining whether the first evaluation indicator of the corresponding first model expression is equal to or greater than a second threshold less than the first threshold.

2. The computer-readable, non-transitory storage medium as set forth in claim 1, wherein the first evaluation indicator is a correlation coefficient.

3. The computer-readable, non-transitory storage medium as set forth in claim 1, wherein the first determining comprises:

determining by a quantifier elimination method, whether a relationship that a specific model expression among the generated first model expressions is equal to or greater than any one of the generated first model expressions other than the specific model expression for all of the predetermined parameters.

4. The computer-readable, non-transitory storage medium as set forth in claim 1, the process further comprising:

carrying out the additional simulation the predetermined number of times, for a combination of the objective function and the designated vertex, for which it is determined in the second determining that the additional simulation is required, while changing values of the predetermined parameters;

generating a second model expression for the combination by using the result of the first simulation and a result of the additional simulation; and calculating a second evaluation indicator of the approximation accuracy for the second model expression, and wherein the first model expression and the first evaluation value for the combination are replaced with the second model expression and the second evaluation value for the combination to execute the first determining and the second determining.

5. A method for generating model expressions of a plurality of objective functions at vertexes of a quadrilateral on a plane for predetermined indicators concerning P and N channels of transistors in a Static Random Access Memory, the method executed by a computer, the method comprising:

allocating the initial number of times of simulation to each of the plurality of objective functions at each of designated vertexes according to weight values that are set in advance based on relationships presumed among the plurality of objective functions at each of the designated vertexes;

carrying out, for each of the plurality of objective functions at each of the designated vertexes, first simulation the allocated number of times while changing values of predetermined parameters;

generating, for each of the plurality of objective functions at each of the designated vertexes, a first model expression from a result of the first simulation, and calculating a first evaluation indicator of an approximation accuracy of the first model expression;

first determining, for each of the generated first model expressions, whether the corresponding first expression has influence on a predetermined yield model expression; and second determining, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function, and wherein the second determining comprises:

upon determining that the corresponding first model expression has influence on the yield model expression, determining whether the first evaluation indicator of the corresponding first model expression is equal to or greater than a first threshold; and upon determining that the corresponding first model expression does not have influence on the yield model expression, determining whether the first evaluation indicator of the corresponding first model expression is equal to or greater than a second threshold less than the first threshold.

6. An apparatus for generating model expressions of a plurality of objective functions at vertexes of a quadrilateral on a plane for predetermined indicators concerning P and N channels of transistors in a Static Random Access Memory, the apparatus comprising:

a simulation controller to allocate the initial number of times of simulation to each of the plurality of objective functions at each of designated vertexes according to weight values that are set in advance based on relationships presumed among the plurality of objective functions at each of the designated vertexes and carry out, for each of the plurality of objective functions at each of the designated vertexes, first simulation the allocated number of times while changing values of predetermined parameters;

a model generator to generate, for each of the plurality of objective functions at each of the designated vertexes, a first model expression from a result of the first simulation, and calculate a first evaluation indicator of an approximation accuracy of the first model expression;

an evaluation unit to determine, for each of the generated first model expressions, whether the corresponding first model expression has influence on a predetermined yield model expression; and determine, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function, and wherein the evaluation unit determines, upon determining that the corresponding first model expression has influence on the yield model expression, whether the first evaluation indicator of the corresponding first model expression is equal to or greater than a first threshold; and determines, upon determining that the corresponding first model expression does not have influence on the yield model expression, whether the first evaluation indicator of the corresponding first model expression is equal to or greater than a second threshold less than the first threshold.

7. An apparatus for generating model expressions of a plurality of objective functions at vertexes of a quadrilateral on a plane for predetermined indicators concerning P and N channels of transistors in a Static Random Access Memory, the apparatus comprising:

a processor configured to execute a process, the process comprising:

allocating the initial number of times of simulation to each of the plurality of objective functions at each of designated vertexes according to weight values that are set in advance based on relationships presumed among the plurality of objective functions at each of the designated vertexes;

carrying out, for each of the plurality of objective functions at each of the designated vertexes, first simulation the allocated number of times while changing values of predetermined parameters;

generating, for each of the plurality of objective functions at each of the designated vertexes, a first model expression from a result of the first simulation, and calculating a first evaluation indicator of an approximation accuracy of the first model expression;

first determining, for each of the generated first model expressions, whether the corresponding first model expression has influence on a predetermined yield model expression; and second determining, for each of the plurality of objective functions at each of the designated vertexes, based on the first evaluation indicator of the corresponding first model expression and whether the corresponding first model expression has influence on the predetermined yield model expression, whether additional simulation is required for the corresponding objective function, and wherein the second determining comprises:

upon determining that the corresponding first model expression has influence on the yield model expression, determining whether the first evaluation indicator of the corresponding first model expression is equal to or greater than a first threshold; and upon determining that the corresponding first model expression does not have influence on the yield model expression, determining whether the first evaluation indicator of the corresponding first model expression is equal to or greater than a second threshold less than the first threshold.

* * * * *